Sept. 5, 1933. A. CALLSEN 1,925,626
EDDY CURRENT ELECTRIC MOTOR
Filed Feb. 10, 1932
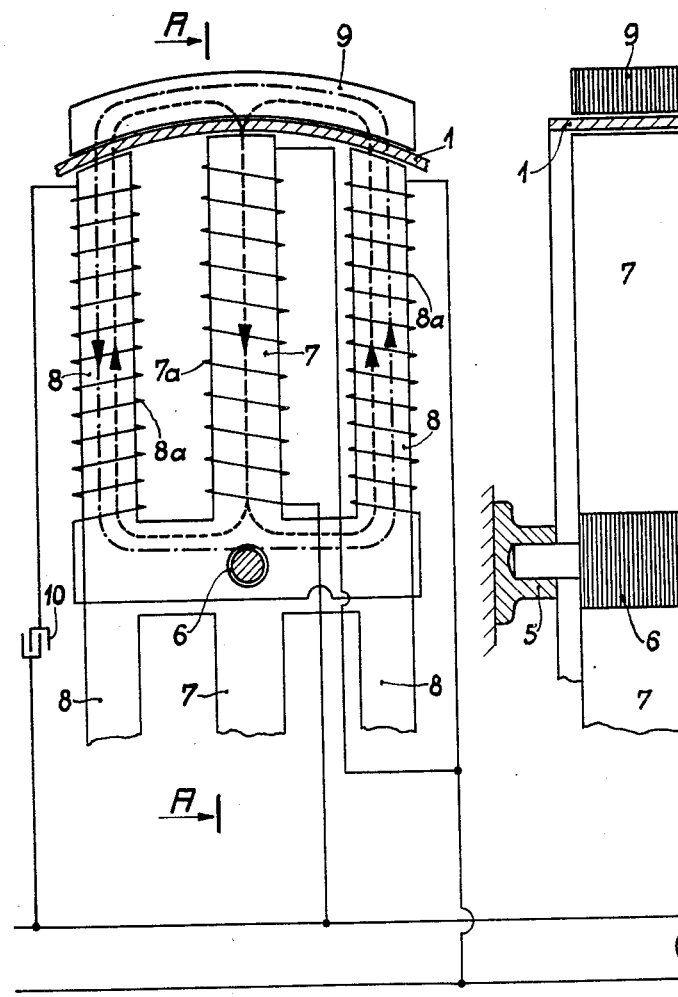
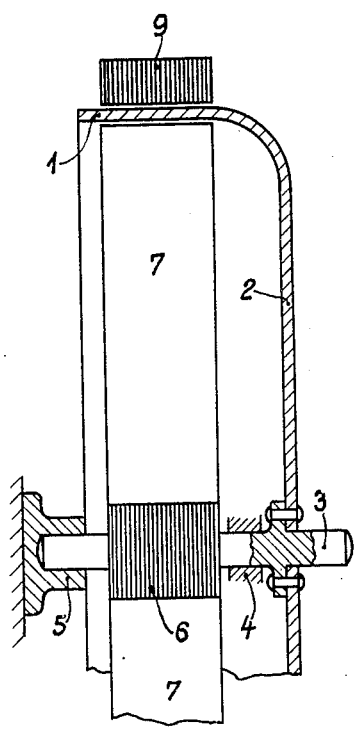

Patented Sept. 5, 1933

1,925,626

UNITED STATES PATENT OFFICE 1,925,626

EDDY CURRENT ELECTRIC MOTOR

Albert Callsen, Stuttgart, Germany, assignor to Robert Bosch Aktiengesellschaft, Stuttgart, Germany Application February 10, 1932, Serial No. 592,156, and in Germany February 21, 1931

5 Claims. (Cl. 172—278)

The present invention relates to electric motors more particularly for talking machines.

The object of the invention is to produce a cheap motor, which is particularly adapted for the direct driving of the turntable, and is as simple and compact as possible in construction.

This object is attained according to the invention in that an eddy current rotor is arranged between a wound three-pronged iron core and an iron yoke situated in its plane, the winding on the central prong, on the one hand, and the winding on the two outer prongs, on the other hand, being connected in parallel with each other, and a condenser being inserted in the circuit of the windings on the outer prongs.

Such a three-pronged iron core with an iron yoke situated in its plane, but with another winding, has already been proposed for meters. Now, as is well-known, a meter has only to work as a measuring instrument, and is unsuitable for use as a motor in the form usual in meters. A meter, for example, with an input capacity or rating of about 1.5 watts, has a turning moment of about 5 to 10 cmg, with a displacement of the effective driving phases of 90°, which is most favourable for the development of a large turning moment. In the present invention it has now been recognized that this very simple construction can be utilized also for motors with a comparatively much larger turning moment. The motor forming the object of the application, with approximately the same use of the material as the meter, and with an input capacity of about 30 watts, has a turning moment of 1000 cmg, and thus works with a much higher degree of efficiency than the meter which has the same construction.

In the accompanying drawing a motor for talking-machines is illustrated as an example of construction of the invention.

Figure 1 is a plan view of the motor, in which the supporting bracket of the eddy current rotor is cut away.

Figure 2 is a side elevation of a section on the line A—A of Figure 1.

The rotor of the motor consists of a metal bowl, preferably made of copper or aluminium, the periphery of which forms a cylindrical drum 1, and the bottom 2 of which is fastened to a shaft 3. This shaft is mounted near the bottom of the drum in a neck bearing 4, and further along on the same side of the drum in a step-bearing 5. The end of the drum shaft remote from the bearings is extended in the form of a pin which carries the turntable and the records.

Within this drum is arranged the exciting field of the motor, consisting of two three-pronged magnet cores lying on a diameter, the yoke parts of which are combined at the middle of the motor and have here a bore 6 for the passage of the shaft 3. The central prongs 7, 7 of the two magnetic fields and the side prongs 8, 8 are wound for their entire length; and the two coils 8a, 8a of the prongs 8, 8 are connected together in series and they lie in series with a condenser 10 in parallel with the coil 7a of the central prong. Opposite the ends of the magnet shanks 7, 7 and 8, 8 an iron yoke 9 of annular sector form is situated outside the drum 1 and is also stationary like the shanks of the magnetic field.

By making the windings and the condenser of suitable dimensions according to known rules a motor is produced which conveniently yields the turning moment necessary for talking-machines with the usual speed within an external diameter which is below that of 25 cm employed for small turntables.

The flux produced by the coil 7a of the central prong 7 runs according to the broken lines in Fig. 1 and has a direction at a given moment which is indicated by the arrows in the broken lines. The flux excited by the coils 8a, 8a runs along the chain-dotted line and has the direction of the arrows inserted in this line. Whilst the two fluxes in the right-hand prong and in the right-hand half of the yoke 9 thus combine, they oppose one another in the left-hand prong and in the left half of the yoke. Accordingly, in order to save iron or space, the left-hand prong can be given a smaller cross-section than the right-hand one.

I declare, that what I claim is:

1. An eddy current electric motor comprising a three-pronged iron core, a winding on the middle prong of said core, windings on the outer prongs of said core connected in parallel with said winding on the middle prong, an unwound iron yoke situated in the plane of said core, a metallic rotor arranged between said core and said yoke and a condenser arranged in the circuit of the winding of said outer prongs.

2. An eddy current electric motor comprising a three-pronged iron core the cross-sections of which prongs are proportional to the flux passing therethrough, a winding on the middle prong of said core, windings on the outer prongs of said core connected in parallel with said winding on the middle prong, an unwound iron yoke situated in the plane of said core, a metallic rotor arranged between said core and said yoke, and a condenser arranged in the circuit of the winding of said outer prongs.

3. An eddy current electric motor comprising a three-pronged iron core, a winding on the middle prong of said core, windings connected in series on the outer prongs of said core and in parallel with said winding on the middle prong, an unwound iron yoke situated in the plane of said core, a metallic rotor arranged between said core and said yoke and a condenser arranged in the circuit of the winding of said outer prongs.

4. An eddy current electric motor comprising a bowl-shaped metal rotor, a three-pronged core arranged within said rotor, a winding on the middle prong of said core, windings on the outer prongs of said core connected in parallel with said winding on the middle prong, an unwound iron yoke situated in the plane of said core outside the periphery of said rotor and a condenser arranged in the circuit of the winding of said outer prongs.

5. An eddy current electric motor comprising a three-pronged iron core, a winding on the middle prong of said core, windings on the outer prongs of said core connected in parallel with said winding on the middle prong, an iron yoke situated in the plane of said core, a metallic rotor arranged between said core and said yoke and a condenser arranged in the circuit of the winding of said outer prongs.

ALBERT CALLSEN.